United States Patent Office 2,951,058
Patented Aug. 30, 1960

2,951,058

RESINOUS CURING PROCESS USING TETRAHYDRO-1 H-OXAZOLO-(3,4,c)-OXAZOLE-7 a-METHANOL

Ivor H. Updegraff, Stamford, and Richard H. Hunt, North Haven, Conn., assignors to American Cyanamid Company, New York, N.Y., a corporation of Maine No Drawing. Filed Dec. 24, 1958, Ser. No. 782,684

4 Claims. (Cl. 260—59)

This invention relates to a process for converting resinous materials comprising essentially linear condensates of a phenolic compound and an aldehyde to substantially insoluble and infusible thermoset products. More particularly, this invention concerns a resinous curing or hardening process whereby a permanently fusible condensate of a phenolic material and formaldehyde is reacted in the presence of tetrahydro-1 H-oxazolo-(3,4 c) oxazole-7 a-methanol to yield thermoset resinous compositions.

It is an object of this invention to provide a process for converting permanently fusible phenol-aldehyde condensates to substantially infusible and insoluble products thereof.

It is a further object of this present invention to provide an improved process for curing essentially linear phenol-formaldehyde condensates wherein the inherent mechanism of the accomplished process results in thermoset products possessing unique beneficial characteristics.

A consideration of the detailed discussion and examples set forth hereinbelow will more completely illustrate these and other objects of this invention.

The resinous compositions which are amenable to the process of this invention are well known in the art. They constitute the essentially linear phenol-aldehyde condensates which are permanently fusible and soluble and cure only upon the addition of a curing agent. These linear condensates are variously known in the art as two-stage phenolic resins or novalaks. More specifically, the two-stage phenolic resins are considered phenol-terminated chain polymers in which the phenolic nuclei are joined by methylene bridges located ortho and/or para to the phenolic hydroxyl group.

Our present invention is, in essence, a process whereby two-stage phenolic resins are cured in the presence of a curing or hardening agent consisting of tetrahydro-1 H-oxazolo-(3,4 c)-oxazole-7 a-methanol, wherein the amount of the hardening agent ranges from about 5 to 30% based on the weight of the solid phenolic resin.

The two-stage phenolic resins with which this invention is concerned are at present extensively used. These resins find use as binders for abrasive wheels, brake linings, foundry resins and like applications. The novalaks are in addition widely used in adhesive, laminating and molding applications. There are a number of advantages to be gained through the use of novalaks which are not observed for one-stage phenolic resins, or for that matter, non-phenolic resins which find use in similar applications. Irrespective of the type of end-use application, several advantages of the novalaks are manifest. These include the relative ease in preparing the condensation product and the exceptional stability of the resin during any intermediate storage period. In molding applications, the advantages to be gained by the use of two-stage phenolic resins especially reside in the rapidity with which cure may be obtained and also the beneficial mechanical properties exhibited by articles prepared from these resinous materials. Also, because novalaks do not cure with the liberation of water, the products derived therefrom have excellent electrical properties and immunity from crazing and cracking faults prominently associated with other resinous condensate types.

Two-stage resins can be prepared by reacting an aldehyde, specifically formaldehyde, with an excess of the phenolic component. In practice it has been found that the excess of the phenol over the aldehydic component may vary only in a rather limited range in order to obtain a suitable product in an efficient processing manner. Accordingly, the preferred molar ratio of aldehyde to phenolic material ranges from about .75 to .85. Ratios approaching 1.0 may be used, thus facilitating the preparation of comparatively high molecular weight condensates in a rather rapid fashion. However, the disadvantage of employing near equivalent ratios of reactants is that difficultly removable cross-linked resinous particles are formed. While a ratio of formaldehyde to phenol as low as 0.5 may be used, there are particular disadvantages in the employment of such a substantial excess of the phenol. Among the disadvantages noted are the long processing cycles required and to some extent the trouble involved in removing unreacted phenol.

Generally a catalyst is employed to facilitate the condensation reaction. The most conventionally used catalysts are of the acid type. Suitable acids catalyst are such as oxalic acid, para-toluene sulfonic acid, phosphoric acid, hydrochloric acid and the like. It is feasible to prepare novalak resins without a catalyst. However, the low reactivity of the phenol with formaldehyde without the presence of a catalyst makes such a method economically unattractive. Approximately, 0.2–0.3% of catalyst based on the phenolic material is used. The temperature that may be employed for this condensation reaction may range from as low as 50° C. up to about 150° C. Since an aqueous reaction is ordinarily employed to produce these resins, the usual effective condensation temperature is in the order of about 100° C. After completion of the condensation reaction, the reaction system is neutralized with a suitable alkali, such as for example, calcium oxide, and then the water later decanted off. The condensate is then desiccated, usually by heating under a vacuum. Novalaks when dehydrated are hard, friable resins at room temperature.

Various phenolic materials may be employed to prepare the novalaks to which this invention pertains. It is preferred to use monohydric substituted single-ring aromatic compounds. Monohydric substituted fused aromatic ring compounds as well as dihydric substituted benzenes may be employed, especially if these types of compounds are used in minor proportion with the monohydric benzenes. The preferred phenolic material is phenol. However, examples of other phenolic materials which may be appropriately used are the alkyl substituted phenols such as represented by ortho, meta and para substituted cresols. Additionally, the various xylenols may be used to prepare the condensates of this invention. Other phenolic materials which may be used to advantage are by-products of the coal and petroleum industry designated respectively coal and petroleum tar acids. These products are essentially impure mixtures of the cresols mentioned hereinabove. The by-products are particularly useful in preparing novalaks which have intended use in foundry resins. Core stock adhesives and like applications wherein the poor color associated with condensates prepared from these materials is of no consequence.

Formalin, that is, aqueous formaldehyde of about 37–44% formaldehyde content is the preferred aldehyde for the preparation of two-stage resins. However, other forms of formaldehyde may be employed such as paraform, trioxane and hexamethylenetetramine. Additionally, other aldehydes such as furfural and the like may be used alone or in combination with formaldehyde or any of the aldehydes mentioned hereinabove.

In addition to the novalak resins prepared from essentially a phenolic material and formaldehyde which have been described above, one may use novalak type resins derived by reacting formaldehyde with a combination of a phenol and melamine. A process describing the preparation of two-stage resins employing melamine in conjunction with a phenol is described in the Updegraff et al. Patent 2,826,559.

As indicated hereinbefore, the use of a hardening agent is required to convert a novalak into a thermoset product. Over the years a number of hardening agents have been proposed to accomplish this curing process. However, only one of these agents, namely, hexamethylenetetramine, has achieved practical importance. Oddly enough, this agent was one of the first proposed to convert two-stage resins into useable thermoset resinous compositions. It was originally believed that hexamethylenetetramine, more commonly called hexamine, functioned as a cross-linking agent by decomposing at elevated temperatures to yield formaldehyde, which constituted the source for methylene cross-linking units, and ammonia, which catalyzed the ensuing cross-linking reaction. However, it had been later determined that properly cured products derived from a reaction mixture of hexamine and novalak contained combined nitrogen in significant amounts relative to that introduced in the form of the curing agent. This finding compelled the reasoning that the hexamine did not decompose to its ultimate constituents as originally believed, but only partially decomposed. Such being the case, the over-all nature of the cross-linking units in a cured composition is deemed to be very complex.

The cross-linking agent of this invention, while capable of ultimately decomposing to formaldehyde and the amine from which it is derived, apparently like hexamine, breaks down in an intermediate fashion during the curing process. Considering the distinction in structural configuration between tetrahydro-1 H-oxazolo- (3,4 c)-oxazole-7 a-methanol of this invention and hexamine in light of the general mode in which these agents serve to cross-link a novalak resin, it is to be expected that the ultimate products derived from the use of these respective agents will differ in physical characteristics. This we have observed to be the case. The novalaks cured with our curing agent, particularly in molding applications, exhibit decidedly different beneficial flow properties. Thus molding compositions cured in accordance with the process of this invention advantageously permits the preparation of complex shaped articles exhibiting a minimum of residual strain. Another advantage of the curing agent of our process over hexamine resides in the fact that it possesses considerably lower melting point than hexamine, that is, 58° C. versus 263° C. for hexamine. Accordingly our novel curing agent when used as contemplated herein is an excellent fluxing agent which assures a desired molecular distribution of the agent throughout the molding composition.

The hardening agent useful in the practice of this invention may be produced by simply mixing tris(hydroxymethyl)aminomethane with an aqueous solution of formaldehyde. The reaction will occur at room temperature; however, it may be accelerated by gently warming. The preferred ratio of tris(hydroxymethyl)aminomethane to formaldehyde in the reaction mixture is approximately 1:2, respectively. The reaction occurring may be represented by the following general equation.

$$\text{HOH}_2\text{C}-\underset{\underset{\text{CH}_2\text{OH}}{|}}{\overset{\overset{\text{CH}_2\text{OH}}{|}}{\text{C}}}-\text{NH}_2 + 2\text{HCHO} \longrightarrow \text{HOH}_2\text{C}-\underset{\underset{\text{CH}_2}{|}}{\overset{\overset{\text{CH}_2}{|}}{\text{C}}}-\text{N}\diagdown\overset{\text{CH}_2}{\underset{\text{CH}_2}{}}\diagup\overset{\text{O}}{\underset{\text{O}}{}} + 2\text{H}_2\text{O}$$

The product may be recovered by removing the water in which the formaldehyde was dissolved and the water of reaction by simple evaporation, solvent extraction, or by azeotropic distillation with benzene. The amount of tetrahydro-1 H-oxazolo-(3,4 c)oxazole-7 a-methanol that may be used in the practice of our process ranges from about 5% to 30% based on the weight of the novalak resin employed. For most purposes, an amount ranging from about 15% to 25% is sufficient to properly cure novalak resins for all types of applications contemplated. Accordingly, this range represents the preferred amounts in our process.

Molding compositions which are particularly exemplary of the applications in which our invention is useful may be prepared by methods well known in the art. Basically, these compositions comprise a mixture of a filler and the thermosetting ingredients forming the resinous binder. Almost invariably, a mold lubricant is included in the composition in order to facilitate the removal of the molded article from the mold after the curing process has been accomplished. Zinc stearate is typical of the materials used as mold lubricants. The fillers which may be used to prepare novalak molding compositions are such as alpha cellulose, wood flour, walnut shell flour, powdered or fibrous asbestos, silicone carbide, carbon black, diatomaceous earth, slate dust, powdered or flaked mica, powdered quartz, cloth cuttings (e.g. cuttings of silk, rayon, wool, linen, cotton, nylon or a cloth made from glass fibers or from polymeric or copolymeric acrylonitrile fibers, etc.), ground cork, sand and the like. Depending upon the particular filler employed and the intended use of the molded product, the filler content may range up to about 80% based on the total weight of the molding composition. In some instances, it may be desirable to form molded articles from the novalak compositions of this invention which contain no filler.

The molding composition may be compounded by two processes. One of these conventional processes consists of combining the novalak resin, curing agent, filler and mold lubricant in the desired proportions and then concomitantly grinding and blending the various components on heated differential rolls. Another suitable method consists of employing the novalak resin in solution form to impregnate the filler. Suitable solvent systems consist of mixtures of water and water-soluble alcohols such as, for example, methanol, ethanol, propanol, isopropanol and the like. A suitable ratio of water to alcohol for dissolving the novalak resin is about 60:40, respectively. The resinous solids, including the hardening agent, which may be used to impregnate the filler is generally in the order of about 60%. This latter described method of preparing the molding composition employing a resinous syrup is especially useful when the novalak resin prepared is intended to be used immediately to prepare the molding composition. In this manner, the expense involved in dehydrating the novalak resin reaction system is eliminated.

In order that those skilled in the art may more fully understand the instant invention the following examples are given in which all parts specified are parts by weight. It is to be understood that these examples are given by way of illustration and any specific enumeration of details contained therein should not be interpreted as a limitation on the case except as indicated in the appended claims.

*Example 1*

Into a suitable reaction vessel, equipped with a stirrer, thermometer and reflux condenser were charged 1692 parts of phenol and 29 parts oxalic acid. With stirring, the aforesaid ingredients were heated to approximately 80° C., whereupon Formalin (37% aqueous formaldehyde) in the amount of 1215 parts was added in a dropwise fashion. Stirring and addition of the formaldehyde in the manner indicated was continued until the temperature of 125° C. was reached. Brisk refluxing occurred at this temperature. As progressive amounts of formaldehyde were added, the reflux temperature gradually decreased until all of the formaldehyde was added. After complete addition of the Formalin (two hours) the reflux temperature had leveled off 103° C. The reaction temperature was held at reflux temperature (102°–103° C.) for an additional two hours, thereupon the mixture was dehydrated by observing a distillation procedure at atmospheric pressure. During the dehydration period the temperature was allowed to rise until it had reached 120° C. at which point the resin was substantially dehydrated. The liquid resinous condensate was then sparged with carbon dioxide gas to remove the last traces of moisture. The resin was then cooled to approximately 80° C. and discharged into shallow trays. Upon cooling to room temperature the novalak resin was broken up into small lumps.

A molding composition was prepared by combining 382 parts of the solid novalak resin described above, 117 parts of tetrahydro-1 H-oxazolo-(3,4 c)-oxazole-7 a-methanol, 500 parts of Solka-Fil 400 (Woodflour) and 5 parts of zinc stearate. These ingredients were ground and blended in a ball-mill wherein they were ground to a fine powder.

The ground molding composition was then used to prepare molded specimens corresponding to a 4 inch diameter disk of ⅛" thickness. A compression type mold was employed to prepare the specimens. Curing conditions were 3½ minutes at 310° F. with a guage pressure of 1050 p.s.i. Proper cure was obtained under these conditions as indicated by the standard acid boil test (no appreciable surface blanching on boiling for 10' in 0.8% $H_2SO_4$ solution). The resultant test disk exhibited a uniform surface appearance particularly in that the surface showed excellent flow properties.

*Example 2*

624 parts of the novalak resin of Example 1 and 145 parts of tetrahydro-1 H-oxazolo-(3,4 c)oxazole-7 a-methanol were dissolved in a sufficient amount of denatured ethanol (2 B alcohol) to give a 35% solids solution. Sulphate kraft paper was impregnated with the above resinous syrup and then dried to remove the solvent under a battery of infra-red lamps. The resulting dry impregnate contained approximately 40% of the resinous mixture and 60% paper content. Six sheets of the dry impregnated paper were pressed into a laminate at 1000 p.s.i. using a temperature of 150° C. and a curing time of about 15 minutes. The cured board was suitable as an electrical insulating material.

We claim:

1. A process for preparing substantially infusible, insoluble resinous products which comprises heating an essentially linear, fusible condensate of a monohydroxy benzene and formaldehyde in the presence of from about 5 to 25% based on the weight of said condensate of tetrahydro-1 H-oxazolo-(3,4 c)-oxazole-7 a-methanol.

2. A process for preparing substantially infusible, insoluble, resinous products which comprises heating an essentially linear, fusible condensate of phenol and formaldehyde in the presence of from about 5 to 25% based on the weight of said condensate of tetrahydro-1 H-oxazolo-(3,4 c)-oxazole-7 a-methanol.

3. A process for preparing substantially infusible, insoluble, resinous products which comprises heating an essentially linear, fusible, acid catalyzed condensation product of from about .75 to .85 mol of formaldehyde and 1 mol of phenol in the presence of from about 5 to 25% based on the weight of said condensate of tetrahydrol-1- H-oxazolo-(3,4 c)-oxazole-7 a-methanol.

4. A process for preparing substantially infusible, insoluble, resinous products which comprises heating an essentially linear, fusible, acid catalyzed condensation product of from about .75 to .85 mol of formaldehyde and 1 mol of phenol in the presence of from about 5 to 25% based on the weight of said condensate of tetrahydro-1 H-oxazolo-(3,4 c)-oxazole-7 a-methanol.

References Cited in the file of this patent

UNITED STATES PATENTS

| 2,426,128 | Trowell | Aug. 19, 1947 |

FOREIGN PATENTS

| 564,506 | Great Britain | Oct. 2, 1944 |